United States Patent Office 2,755,831
Patented July 24, 1956

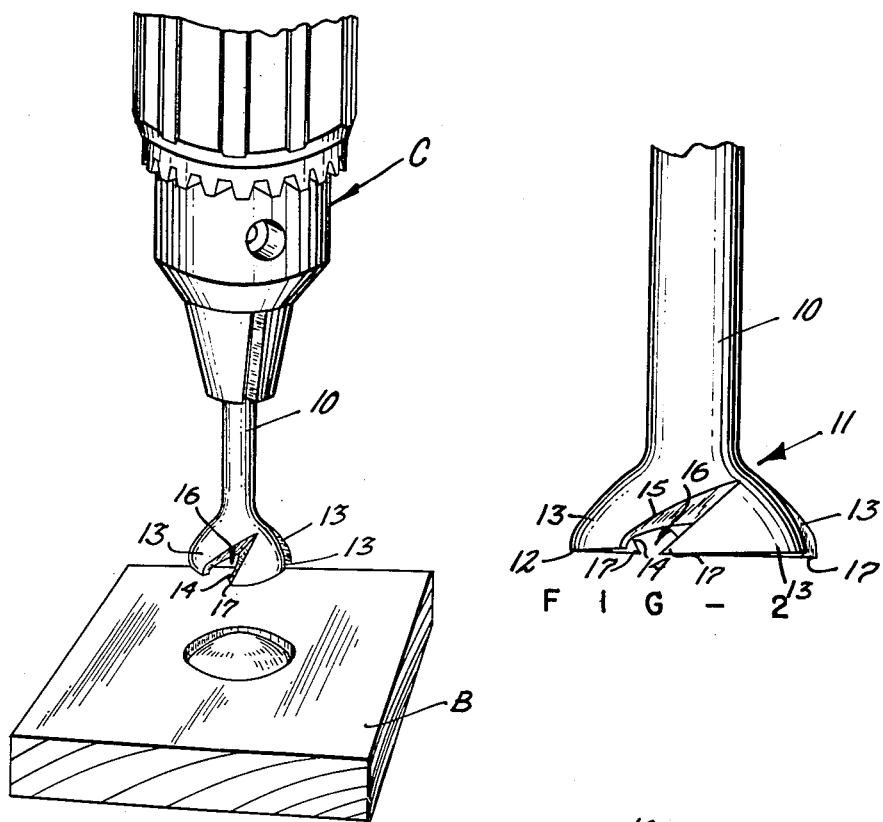
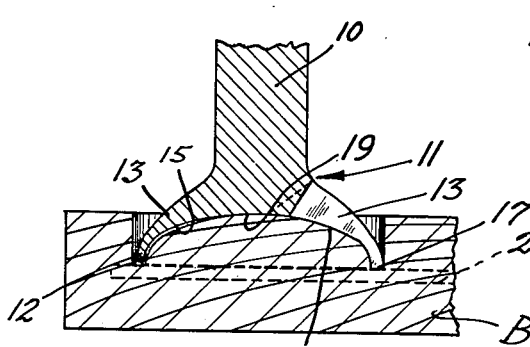

2,755,831

ROTARY END THRUST CUTTER

Carl H. Johnson, Spokane, Wash.

Application January 21, 1954, Serial No. 405,435

3 Claims. (Cl. 144—219)

This invention is a rotary cutting tool.

One object of the invention lies in the provision of a rotary cutting tool designed to cut simulated decorative peg facings from a block of material.

Another object of the invention lies in the provision of a rotary cutting tool designed to shape the ends of dowel pins or pegs to enhance their decorative ability.

Another object of the invention lies in the provision of a simulated decorative peg facing cutting tool which is adapted for use with either power or hand tools and which may be easily applied to conventional tools having a tool chuck.

The nature and advantages of my invention will appear more fully from the following description and the accompanying drawings wherein a preferred form of the invention is shown. It should be understood, however, that the drawings and description are illustrative and are not intended to limit the invention except insofar as it is limited by the claims.

In the drawings:

Figure 1 is a perspective view of my rotary cutting tool secured in the chuck of a power tool and disposed above a block from which a simulated decorative peg is being cut.

Figure 2 is a side elevation of the rotary cutting tool having a portion of its shank broken away.

Figure 3 is a bottom plan view showing the cutting head of the improved tool; and Figure 4 is a vertical cross section as at line 4—4 of Figure 3 showing the tool applied to a block from which a simulated decorative peg facing is being cut.

Referring now in detail to the drawings, the rotary cutting tool has an elongated shank 10 having a cylindrical peripheral face and being adapted to be inserted and secured within the chuck of a rotating device. I wish it to be understood that the shank may be of other shapes if found desirable such as that of a wood drill having an upwardly tapered pyramidal end. Coaxial with the shank 10 at one end, I provide a substantially concavo-convex head 11 which initially is a complete circle and on the concave lower side is provided with an annular depending rim 12. However, the head is divided into triradiate cutting fins 13 having leading cutting edges 14 and trailing edges 15. These fins are defined by inwardly tapered slots 16 which are tangentially arranged relative to the periphery of the shank 10 and angularly disposed relative to its axis each in the same direction about the head 11, thus providing the cutting edges 14 disposed at an acute angle.

It is necessary to dispose the cutting edges 14 below the trailing edges 15 and therefore each fin is provided with a slight radial twist to accomplish this purpose. This radial twist also lowers the toes 17 of the now segmental rim portions 12 and raises the heel 18 thereof. Close inspection of the outline of the rim segments 12 as compared with the circular broken line of Figure 3 will show that the outer marginal edges of the rim segments 12 are diminished from the toe 17 toward the heel 18, thus providing clearance for the tool and preventing overheating thereof.

The amount of radial twist applied to the individual fins is of course dependent upon the work for which the tool is adapted and is such so as to provide a thin controlled cutting depth to prevent digging or gouging of the cutter into the block.

Inspection of Figure 3 will also show that the tapered slots terminate inwardly spaced from the axis of the shank 10 providing a face or flat area 19 at the axis of the head 11 and this face serves as a cutting depth stop for the tool where the face contacts the top of the simulated decorative peg facing being cut as indicated in Figure 4 and prevents its further downward movement.

After the simulated peg facings are cut from the block a saw is used to remove the simulated facings from the block by cutting a kerf indicated by the broken lines 20 of Figure 4.

The simulated decorative peg facings are applied by the use of a good glue and no other means is required for securing them.

Having thus described my invention, I claim:

1. As an article of manufacture, a rotary cutting tool comprising a rotatable shank carrying a head rigidly secured at one end coaxial therewith; said head having a concave outer face and triradiate cutting fins defined by inwardly tapered slots tangentially arranged relative to the periphery of said shank and angularly disposed relative to its axis, to provide acute angle cutting edges on said fins; said slots inwardly terminating spaced from the axis of said head to define a depth of cut stop and each said fin having a slight radial twist to dispose its trailing edge above the plane of rotation of its cutting edge.

2. As an article of manufacture, a rotary cutting tool comprising a rotatable shank having a head rigidly secured at one end coaxial therewith; said head having a concave outer face and triradiate cutting fins defined by inwardly tapered slots inwardly terminating spaced from the axis of said shank and tangentially arranged relative to the periphery of said shank and angularly disposed relative to its axis to provide acute angle cutting edges on said fins; each said fin having a slight radial twist to raise its trailing edge above the plane of rotation of its cutting edge; and each fin having a coaxial depending rim segment provided with a cutting toe and a raised heel.

3. As an article of manufacture, a rotary cutting tool comprising a rotatable shank having a head with a concave outer face rigidly secured at one end coaxial therewith; said head having triradiate cuttings fins defined by inwardly tapered slots tangentially arranged relative to the periphery of said shank and angularly disposed relative to its axis to provide acute angle cutting edges on the concave outer face of said fins; and said slots terminating spaced from the axis of said shank and providing a surface for limiting the cutting depth.

References Cited in the file of this patent

UNITED STATES PATENTS

| 385,325 | Shimer | June 26, 1888 |
| 528,725 | Hussey | Nov. 6, 1894 |
| 2,674,281 | Fullmer | Apr. 6, 1954 |

FOREIGN PATENTS

| 71,795 | Austria | May 25, 1916 |